(12) United States Patent
Zhang et al.

(10) Patent No.: US 12,425,206 B2
(45) Date of Patent: Sep. 23, 2025

(54) METHOD OF DYNAMICALLY LOADING ENCRYPTION ENGINE

(71) Applicant: GUANGZHOU AUTOMOBILE GROUP CO., LTD., Guangzhou (CN)

(72) Inventors: Yinhua Zhang, Guangzhou (CN); Wenfeng Lu, Guangzhou (CN); Jinzhao Liu, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 449 days.

(21) Appl. No.: 17/991,743

(22) Filed: Nov. 21, 2022

(65) Prior Publication Data

US 2023/0093105 A1 Mar. 23, 2023

Related U.S. Application Data

(63) Continuation-in-part of application No. PCT/CN2021/101481, filed on Jun. 22, 2021.

(30) Foreign Application Priority Data

Jul. 20, 2020 (CN) .......................... 202010696213.8

(51) Int. Cl.
*H04L 9/08* (2006.01)
*H04L 9/30* (2006.01)
*H04L 9/32* (2006.01)

(52) U.S. Cl.
CPC .......... *H04L 9/0869* (2013.01); *H04L 9/0825* (2013.01); *H04L 9/3073* (2013.01); *H04L 9/3249* (2013.01)

(58) Field of Classification Search
USPC .......................................................... 380/46
See application file for complete search history.

(56) References Cited

U.S. PATENT DOCUMENTS

| 6,028,933 A | * | 2/2000 | Heer | ................... H04L 63/0869 380/282 |
| 2020/0042709 A1 | * | 2/2020 | Fu | .......................... G06F 9/4401 |

FOREIGN PATENT DOCUMENTS

| CN | 103716166 A | * | 4/2014 | ............... H04L 9/32 |
| CN | 105376051 | | 3/2016 | |
| CN | 105376051 A | * | 3/2016 | ............... H04L 9/06 |
| CN | 109120998 A | * | 1/2019 | ............. H04L 69/26 |

* cited by examiner

*Primary Examiner* — Sanchit K Sarker
(74) *Attorney, Agent, or Firm* — ScienBiziP, P.C.

(57) ABSTRACT

A method of dynamically loading an encryption engine generates a relationship between encryption identifiers and information parameters. The information parameters includes information security levels, information sizes, and information access speeds. The encryption identifiers include a soft encryption identifier and a hard encryption identifier. A target encryption identifier of current to-be-encrypted information is obtained, and a target encryption mode of the current to-be-encrypted information is determined. An encryption engine corresponding to the current to-be-encrypted information is loaded according to the encryption mode. The method can reduce waste of resources, and improve an efficiency of encryption and decryption of information.

18 Claims, 5 Drawing Sheets

Generate a relationship between encryption identifiers and information parameters — S1

Obtain a target encryption identifier of current to-be-encrypted information, and determine a target encryption mode of the current to-be-encrypted information — S2

Load an encryption engine corresponding to the current to-be-encrypted information — S3

METHOD OF DYNAMICALLY LOADING ENCRYPTION ENGINE

CROSS-REFERENCE TO RELATED APPLICATIONS

The present disclosure claims a priority of a Chinese patent application, which is filed in China National Intellectual Property Administration (CNIPA) on Jul. 20, 2020, entitled "Method of Dynamically Loading Encryption Engine", and assigned a serial numbered 202010696213.8. All contents of Chinese patent application are hereby incorporated by reference in the present application.

FIELD

The subject matter herein relates to Internet-of-Vehicles (IoV) communication security, and particularly to a method of dynamically loading an encryption engine.

BACKGROUND

At present, there are two main types of encryption in the field of IoV communication security: soft encryption and hard encryption. Soft encryption refers to a communication protection technology that does not require additional hardware devices, and generally authorizes communication based on serial numbers or license files. Usually the soft encryption binds computer software and hardware features, such as central processing unit (CPU), basic input/output system (BIOS), hard disk, media access control (MAC) address, computer name, user name, etc. Since no additional hardware device is used, it is considered as "soft encryption". Although security strength of the soft encryption is not as high as that of the hard encryption, the soft encryption has many advantages. For example, no additional hardware device or logistics are needed for the soft encryption, encryption and decryption is faster, and electronic distribution can be realized. The soft encryption is easier to manage and maintain, which helps to improve authorization efficiency and user experience. In general, software protection, distribution and management costs of software developers are reduced, and competitiveness of the software developers is improved.

Hard encryption refers to a communication protection technology that requires additional hardware devices. At present, the main hard encryption is encryption lock. According to different CPUs used by the encryption lock, the encryption lock can be ordinary encryption lock or smart card encryption lock. Security strength of the hard encryption is higher. Hard encryption has many characteristics. For example, the hard encryption is suitable for traditional one-time permanent authorization, which may not be convenient to realize trial version and on-demand purchase. The additional hardware devices increase cost in production, initialization, logistics, installation and maintenance. Electronic distribution based on the Internet cannot be realized. Installation of drivers and client components and the additional hardware devices may affect user experience. The hardware devices may be difficult to upgrade, track and manage after-sales.

One encryption method can be designed for each IoV communication product, either soft encryption or hard encryption. As mentioned above, security strength is not very high for the soft encryption. Some information (such as highly confidential information) requires a higher security strength, and the information may be insecure if the soft encryption is adopted. Some information (such as non-confidential information) requires a lower security strength, and resources will be wasted and encryption time will increase if the hard encryption is adopted.

Existing encryption method may provide insufficient security strength, waste resources, and/or increase encryption and decryption time.

SUMMARY

The technical problem to be solved by the embodiments of the present disclosure is to provide a method of dynamically loading an encryption engine. The method adopts different types of encryption for different information, so that encryption requirements of different information are met, waste of resources is reduced, and the efficiency of encryption and decryption of the information is improved.

In order to solve the above-mentioned technical problem, a method of dynamically loading an encryption engine is provided, the method including: step S1, generating a relationship between encryption identifiers and information parameters, wherein the information parameters include information security levels, information sizes, and information access speeds, the encryption identifiers include a soft encryption identifier indicating a soft encryption mode and a hard encryption identifier indicating a hard encryption mode; step S2, obtaining a target encryption identifier of current to-be-encrypted information, and determining a target encryption mode of the current to-be-encrypted information according to the encryption identifier; and step S3, loading an encryption engine corresponding to the current to-be-encrypted information according to the target encryption mode.

Furthermore, step S1 further includes: dividing the information security levels into a high security level and a low security level; dividing the information sizes into a large size and a small size by comparing the information sizes with a storage space threshold; and dividing the information access speeds into a fast access speed and a slow access speed by comparing the information access speeds with an access speed threshold.

Furthermore, the relationship is generated by specifying that the information parameters including the low security level, the small size, and the fast access speed correspond to the encryption identifiers of the soft encryption identifier, and the information parameters including any of the high security level, the small size, and the fast access speed correspond to the encryption identifiers of the hard encryption identifier.

Furthermore, the storage space threshold is 500 k, the information sizes are designated as the large size when the information sizes are greater than or equal to 500 k, and the information sizes are designated as the small size when the information sizes are less than 500 k, and wherein the access speed threshold is 100 ms, the information access speeds are designated as the slow access speed when the information access speed are greater than or equal to 100 ms, and the information access speeds are designated as the fast access speed when the information access speed are less than 100 ms.

Furthermore, the step S2, obtaining a target encryption identifier of current to-be-encrypted information includes: reading the target encryption identifier carried in the current to-be-encrypted information; or querying a table recording the relationship generated in step S1.

Furthermore, the step S3, loading an encryption engine corresponding to the current to-be-encrypted information according to the encryption mode includes loading a soft encryption engine or loading a hard encryption engine, wherein loading a soft encryption engine includes: initializing a chip engine; generating a chip key; and loading the chip key.

Furthermore, initializing a chip engine includes: constructing the chip engine by invoking a Secure Sockets Layer (SSL) initialization function and an engine loading function; binding the chip engine to an index by invoking a function for initializing engine names; registering an encryption algorithm of the chip engine in an OpenSSL engine by invoking a registration function for encryption algorithms; and setting the encryption algorithm of the chip engine to be an RSA algorithm by default by invoking an engine setup function.

Furthermore, generating a chip key includes: generating a key pair by invoking a key generation function; determining whether the soft encryption engine includes a key obtaining algorithm; when the soft encryption engine includes the key obtaining algorithm, generating a key by invoking a built-in key generator, and returning a key structure directly; and when the soft encryption engine does not include the key obtaining algorithm, invoking a key obtaining algorithm in the chip engine, generating a pseudo private key through a soft algorithm, obtaining numbers N and E in the key pair by invoking a key obtaining interface, determining whether the chip key is successfully generated, replacing numbers N and E in the pseudo private key with the numbers N and E in the key pair and returning the key structure when the chip key is successfully generated, and returning an error code when the chip key is not successfully generated.

Furthermore, loading the chip key includes: trying to read a soft key file downloaded along with a vehicle digital certificate by invoking a key loading function, and determining whether the soft key file is read successfully; when the soft key file is not read successfully, creating a new soft key file, writing default key information to the new soft key file, and passing a key file handle to construct an EVP_PKEY structure for storing asymmetric key information; when the soft key file is read successfully, passing the key file handle to construct the EVP_PKEY structure; invoking a key query interface to try to obtain the numbers N and E in the key pair, and determining whether the numbers N and E in the key pair are obtained successfully; when the numbers N and E in the key pair are obtained successfully, replacing numbers N and E in the EVP_PKEY structure with the numbers N and E in the key pair, and returning the EVP_PKEY structure; and when the numbers N and E in the key pair are not obtained successfully, returning a null pointer.

Furthermore, loading a hard encryption engine includes: loading the hard encryption engine; generating an original random number through a random function, and sending the original random number to the hard encryption engine; controlling the hard encryption engine to load an encryption algorithm engine to encrypt the original random number to obtain an encrypted random number; sending the encrypted random number to a decryption engine to decrypt to obtain a decrypted random number; and comparing the decrypted random number with the original random number.

Implementation of the embodiments of the present disclosure will have the following advantages. The present disclosure designs two types of encryption (i.e., soft encryption and hard encryption) for one system according to characteristics of different information, and dynamically load two types of encryption engine according to content of the information and situation. The present disclosure has the advantages of both soft encryption and hard encryption, avoids their shortcomings, improves encryption strength of highly confidential information and access speed of non-confidential information, reduces the waste of resources, and improves the efficiency of encryption and decryption of the information.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

The drawings combined with the detailed description illustrate the embodiments of the present disclosure hereinafter.

Figure 1:
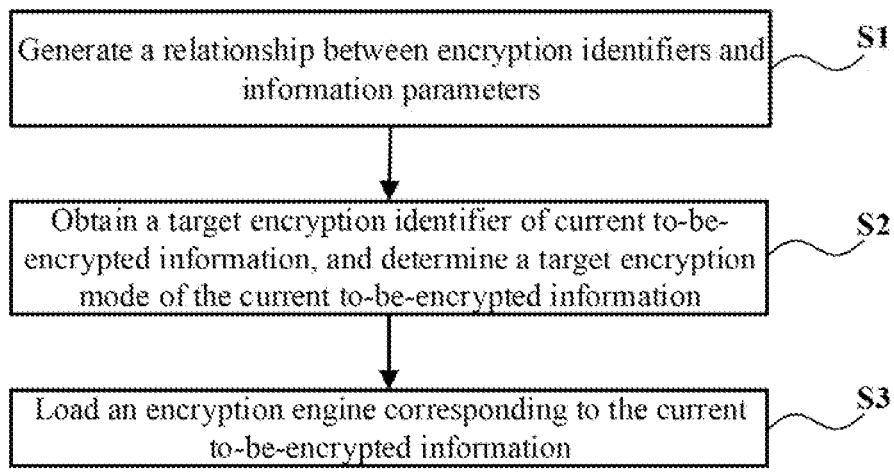
FIG. 1 is a flowchart of a method of dynamically loading an encryption engine provided in one embodiment of the present disclosure.
Figure 2:
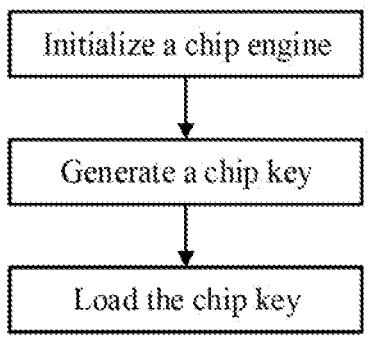
FIG. 2 is a flowchart of loading a soft encryption engine in one embodiment of the present disclosure.
Figure 3:
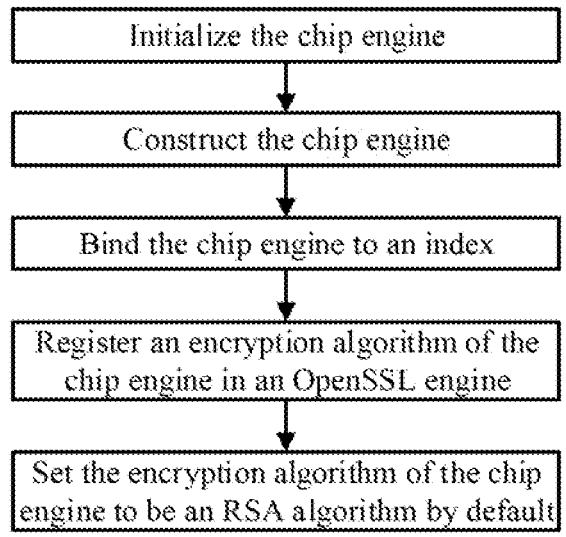
FIG. 3 a flowchart of initializing a chip engine in one embodiment of the present disclosure.
Figure 4:
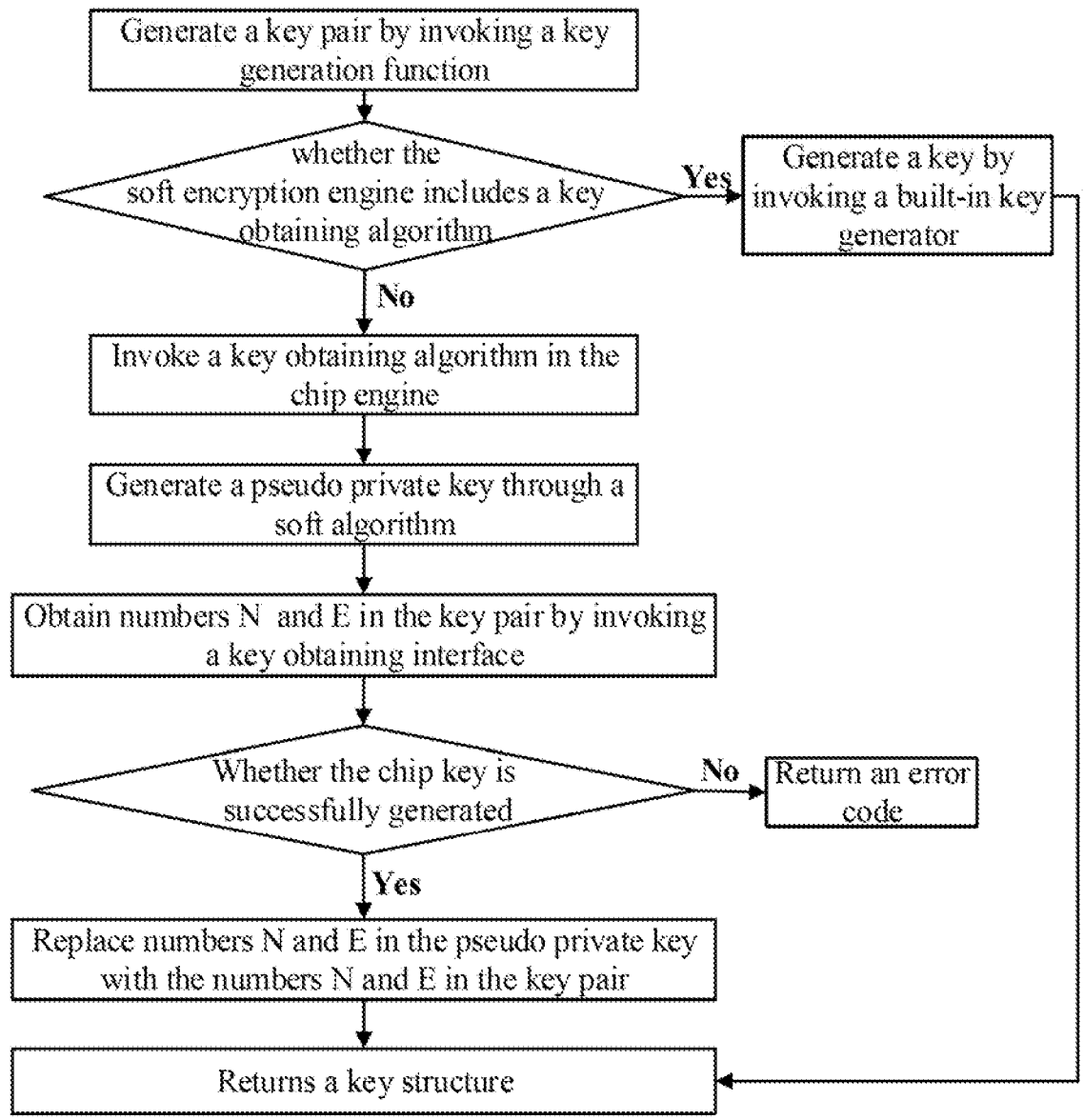
FIG. 4 is a flowchart of generating a chip key in one embodiment of the present disclosure.
Figure 5:
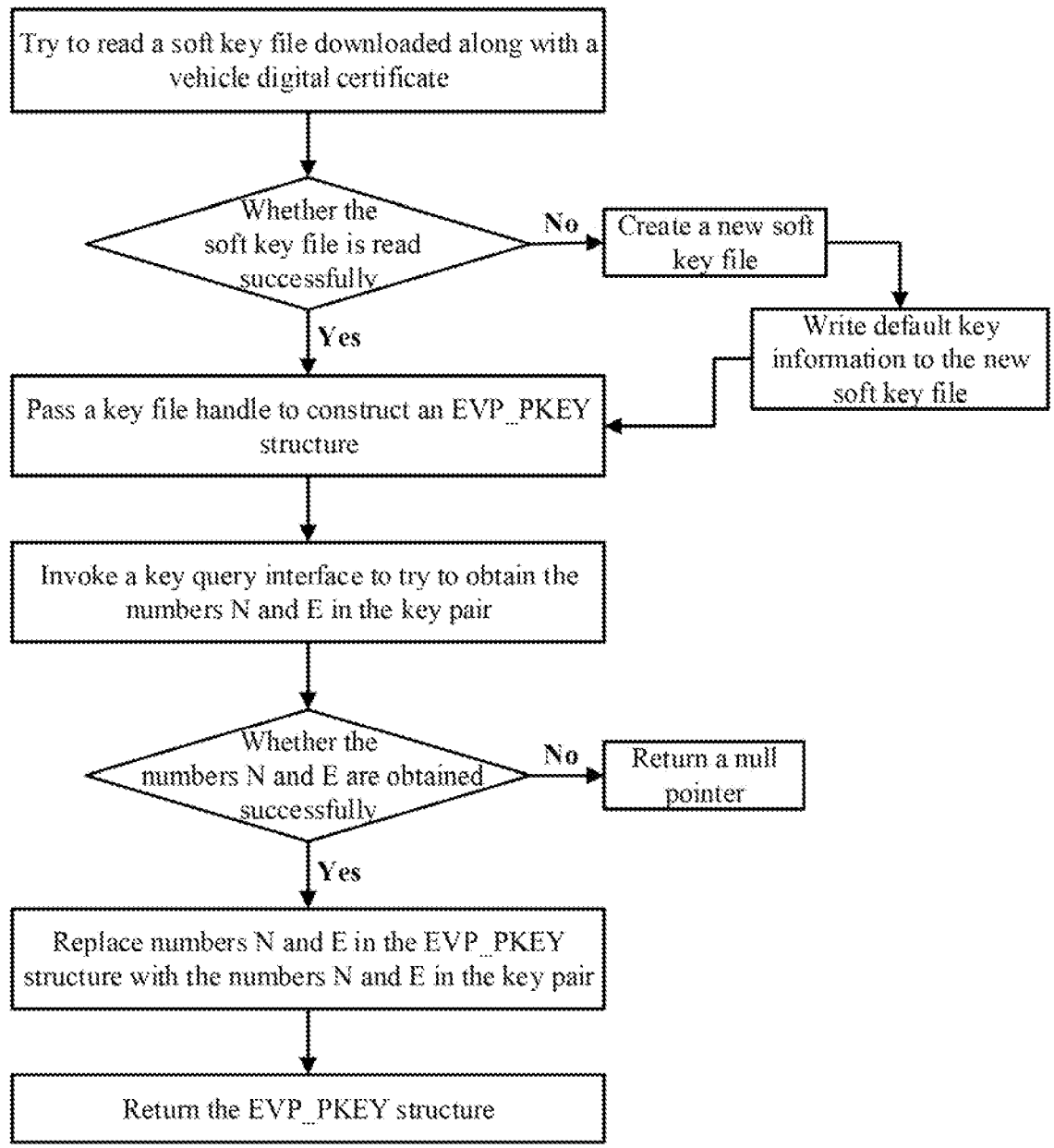
FIG. 5 is a flowchart of loading the chip key in one embodiment of the present disclosure.

FIG. 1 is a flowchart of a method of dynamically loading an encryption engine provided in one embodiment of the present disclosure. The method can include block S1-S3.

In block S1, a computing device generates a relationship between encryption identifiers and information parameters. The information parameters include information security levels, information sizes, and information access speeds. The encryption identifiers include a soft encryption identifier that indicates a soft encryption mode and a hard encryption identifier that indicates a hard encryption mode.

In block S2, the computing device obtains a target encryption identifier of current to-be-encrypted information, and determines a target encryption mode of the current to-be-encrypted information according to the encryption identifier. The target encryption identifier can be the soft encryption identifier or the hard encryption identifier. The target encryption mode can be the soft encryption mode or the hard encryption mode.

In block S3, the computing device loads an encryption engine corresponding to the current to-be-encrypted information according to the target encryption mode.

The information parameters include information security levels, information sizes, and information access speeds. An information security level of certain information refer to confidentiality of the certain information. The higher the confidentiality, the higher the information security level, indicating that a higher degree of encryption is required. An information size of the certain information refers to storage space required for the certain information. An information access speed of the certain information refers to whether the certain information needs to be quickly accessed. In one embodiment, the computing device can divide the information security levels into a high security level and a low security level. For example, information security levels of entertainment interactive information of a vehicle is generally low, while information security levels of location information of the vehicle is high. The computing device can divide the information sizes into a large size and a small size by comparing the information sizes with a storage space threshold. The computing device can further divide the information access speeds into a fast access speed and a slow access speed by comparing the information access speeds with an access speed threshold.

In one embodiment, the storage space threshold can be 500 k. The information sizes are designated as the large size when the information sizes are greater than or equal to 500 k, and the information sizes are designated as the small size when the information sizes are less than 500 k. The access speed threshold can be 100 ms. The information access speeds are designated as the slow access speed when the information access speed are greater than or equal to 100 ms, and the information access speeds are designated as the fast access speed when the information access speed are less than 100 ms.

For any to-be-encrypted information, according to an information security level, an information size, and an information access speed of to-be-encrypted information, a corresponding encryption identifier can be obtained according to the relationship. The encryption identifier indicates an encryption mode of the to-be-encrypted information. In one embodiment, the encryption identifiers include a soft encryption identifier and a hard encryption identifier. The soft encryption identifier indicates a soft encryption mode, and the hard encryption identifier indicates a hard encryption mode. The soft encryption identifier and the hard encryption identifier can be distinguished by different values. For example, the soft encryption identifier can be represented by a value of 0, and the hard encryption identifier can be represented by a value of 1.

In one embodiment, the relationship is generated by specifying that the information parameters including the low security level, the small size, and the fast access speed correspond to the encryption identifiers of the soft encryption identifier, and the information parameters including any of the high security level, the small size, and the fast access speed correspond to the encryption identifiers of the hard encryption identifier. For information with the low security level, the small storage space, and the fast access speed, the soft encryption can improve the efficiency of encryption and decryption. For information with the high security level, the hard encryption can improve an encryption strength.

In block S2, the computing device obtains the target encryption identifier in real time, and determines the target encryption mode. The computing device can read the target encryption identifier carried in the current to-be-encrypted information directly, or query a table recording the relationship. As mentioned above, the soft encryption identifier can be represented by a value of 0, and the hard encryption identifier can be represented by a value of 1, the value of 0 or 1 can be carried in the current to-be-encrypted information. The table recording the relationship can be a one-dimensional table. The encryption identifiers can be represented by the values 1 and 0 in the table.

According to block S2, the computing device can determine encryption modes of different to-be-encrypted information in real time. For example, for user portrait information with the high security level, a hard encryption identifier is obtained and a hard encryption mode is determined accordingly. For entertainment interactive information with the low security level, the small size, and the fast access speed, a soft encryption identifier is obtained and a soft encryption mode is determined accordingly.

In block S3, the computing device loads the encryption engine corresponding to the current to-be-encrypted information according to the target encryption mode. The following describes process of loading a soft encryption engine and loading a hard encryption engine. It can be understood that the process is only an example, the embodiments of the present disclosure does not limit the specific hard encryption technology or soft encryption technology, and common hard encryption technology or soft encryption technology in the art can be used in block S3.

The process of loading the soft encryption engine are shown in FIG. 2-FIG. 5.

Firstly, the computing device initialize a chip engine. The computing device may construct the chip engine by invoking a Secure Sockets Layer (SSL) initialization function and an engine loading function, and bind the chip engine to an index by invoking a function for initializing engine names. The computing device may register an encryption algorithm of the chip engine in an OpenSSL engine by invoking a registration function for encryption algorithms, and set the encryption algorithm of the chip engine to be an RSA algorithm by default by invoking an engine setup function.

Secondly, the computing device generates a chip key. The computing device may generate a key pair by invoking a key generation function (e.g., RSA_generate_key or RSA_generate_key_ex), and determines whether the soft encryption engine includes a key obtaining algorithm. If the soft encryption engine includes the key obtaining algorithm, the computing device generates a key by invoking a built-in key generator (e.g., rsa_builtin_keygen), and returns a key structure directly. If the soft encryption engine does not include the key obtaining algorithm, the computing device invokes a key obtaining algorithm in the chip engine, generates a pseudo private key through a soft algorithm, and obtains numbers N (modulus) and E (exponent) in the key pair by invoking a key obtaining interface. The computing device determines whether the chip key is successfully generated. If the chip key is successfully generated, the computing device replaces numbers N and E in the pseudo private key with the numbers N and E in the key pair, and returns the key structure. If the chip key is not successfully generated, the computing device returns an error code.

Finally, the computing device loads the chip key. The computing device may try to read a soft key file downloaded along with a vehicle digital certificate by invoking a key loading function (e.g., ENGINE_load_private_key or ENGINE_load_public_key), and determines whether the soft key file is read successfully. If the soft key file is not read successfully, the computing device creates a new soft key file, writes default key information to the new soft key file, and passes a key file handle (such as by invoking PEM_read_PrivateKey) to construct an EVP_PKEY structure for storing asymmetric key information. If the soft key file is read successfully, the computing device passes the key file handle to construct the EVP_PKEY structure. The computing device invokes a key query interface (e.g., MizerQueryRsaKey) to try to obtain the numbers N and E in the key pair, and determines whether the numbers N and E in the key pair are obtained successfully. If the numbers N and E in the key pair are obtained successfully, the computing device replaces numbers N and E in the EVP_PKEY structure with the numbers N and E in the key pair, and returns the EVP_PKEY structure. If the numbers N and E in the key pair are not obtained successfully, the computing device returns a null pointer.

Figure 6:
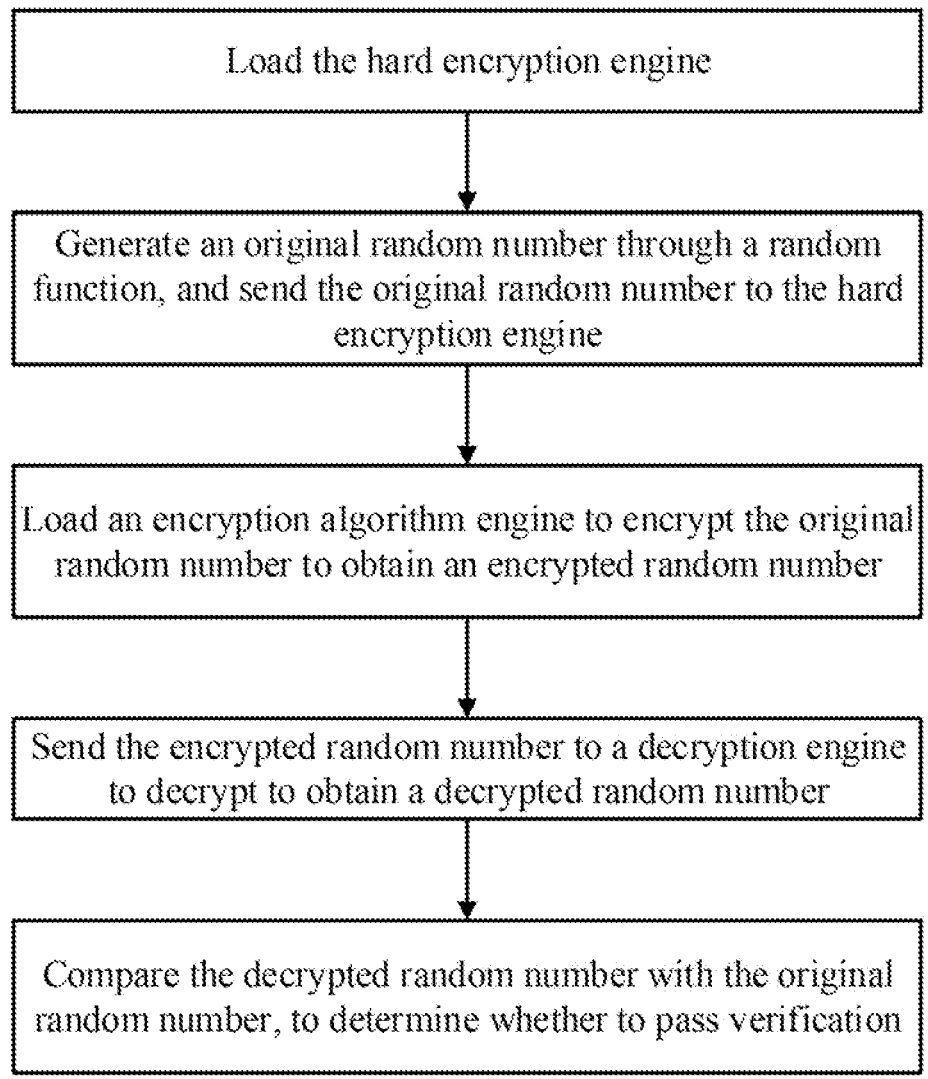
FIG. 6 is a flowchart of loading a hard encryption engine in one embodiment of the present disclosure.

The process of loading the hard encryption engine is shown in FIG. 6. Firstly, the computing device loads the hard encryption engine, generates an original random number through a random function, and sends the original random number to the hard encryption engine. The computing device controls the hard encryption engine to load an encryption algorithm engine to encrypt the original random number to obtain an encrypted random number. The computing device sends the encrypted random number to a decryption engine to decrypt to obtain a decrypted random number. The computing device compares the decrypted random number with the original random number, to determine whether to pass verification.

Figure 7:
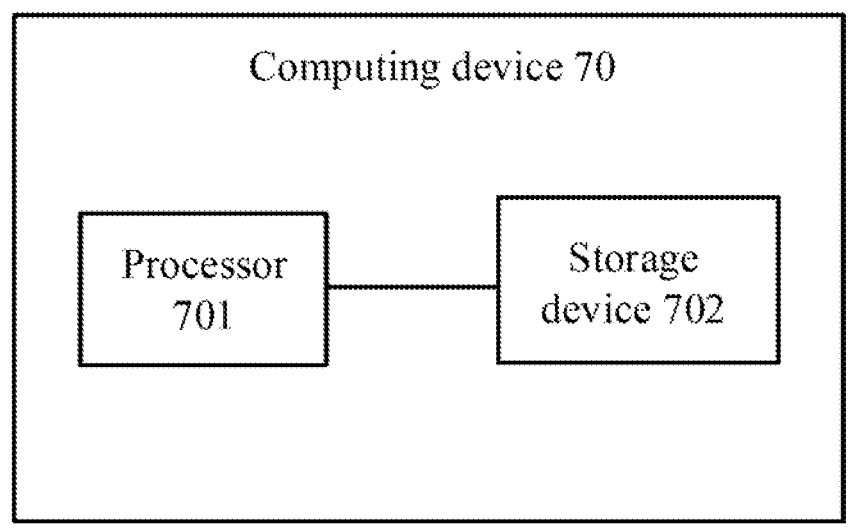
FIG. 7 is a block diagram of a computing device implementing the method of dynamically loading an encryption engine in one embodiment of the present disclosure.

FIG. 7 is a block diagram of a computing device implementing the method of dynamically loading an encryption engine in one embodiment of the present disclosure. The computing device 70 may be a mobile phone, a tablet computer, a personal digital assistant, a notebook computer, or other computing device. The computing device 70 may be installed in a vehicle. The computing device may include at least one processor 701 and a storage device 702. The at least one processor 701 is used to execute computer programs, such as an operating system and a system implementing the method of dynamically loading an encryption engine, installed in the computing device 70. The storage device 702 stores computer-readable instructions of the computer programs. The storage device 702 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A method of dynamically loading an encryption engine, comprising:
    step S1, generating a relationship between encryption identifiers and information parameters, wherein the information parameters comprise information security levels, information sizes, and information access speeds, the encryption identifiers comprise a soft encryption identifier indicating a soft encryption mode and a hard encryption identifier indicating a hard encryption mode;
    step S2, obtaining a target encryption identifier of current to-be-encrypted information, and determining a target encryption mode of the current to-be-encrypted information according to the encryption identifier; and
    step S3, loading an encryption engine corresponding to the current to-be-encrypted information according to the target encryption mode, comprising loading a soft encryption engine or loading a hard encryption engine, wherein loading the soft encryption engine comprises: initializing a chip engine; generating a chip key; and loading the chip key.

2. The method according to claim 1, step S1 further comprising:
    dividing the information security levels into a high security level and a low security level;
    dividing the information sizes into a large size and a small size by comparing the information sizes with a storage space threshold; and
    dividing the information access speeds into a fast access speed and a slow access speed by comparing the information access speeds with an access speed threshold.

3. The method according to claim 2, wherein the relationship is generated by specifying that the information parameters comprising the low security level, the small size, and the fast access speed correspond to the encryption identifiers of the soft encryption identifier, and the information parameters comprising any of the high security level, the small size, and the fast access speed correspond to the encryption identifiers of the hard encryption identifier.

4. The method according to claim 2, wherein the storage space threshold is 500 Kilobyte (500 KB), the information sizes are designated as the large size when the information sizes are greater than or equal to 500 KB, and the information sizes are designated as the small size when the information sizes are less than 500 KB, and wherein the access speed threshold is 100 ms, the information access speeds are designated as the slow access speed when the information access speed are greater than or equal to 100 ms, and the information access speeds are designated as the fast access speed when the information access speed are less than 100 ms.

5. The method according to claim 4, wherein the step S2, obtaining the target encryption identifier of current to-be-encrypted information comprises:
    reading the target encryption identifier carried in the current to-be-encrypted information; or
    querying a table recording the relationship generated in step S1.

6. The method according to claim 1, wherein initializing the chip engine comprises:
    constructing the chip engine by invoking a Secure Sockets Layer (SSL) initialization function and an engine loading function;
    binding the chip engine to an index by invoking a function for initializing engine names;
    registering an encryption algorithm of the chip engine in an OpenSSL engine by invoking a registration function for encryption algorithms; and
    setting the encryption algorithm of the chip engine to be an RSA algorithm by default by invoking an engine setup function.

7. The method according to claim 6, wherein generating the chip key comprises:
    generating a key pair by invoking a key generation function;
    determining whether the soft encryption engine comprises a key obtaining algorithm;
    when the soft encryption engine comprises the key obtaining algorithm, generating a key by invoking a built-in key generator, and returning a key structure directly; and
    when the soft encryption engine does not comprise the key obtaining algorithm, invoking a key obtaining algorithm in the chip engine, generating a pseudo private key through a soft algorithm, obtaining numbers N and E in the key pair by invoking a key obtaining interface, determining whether the chip key is successfully generated, replacing numbers N and E in the pseudo private key with the numbers N and E in the key pair and returning the key structure when the chip key is successfully generated, and returning an error code when the chip key is not successfully generated.

8. The method according to claim 7, wherein loading the chip key comprises:
trying to read a soft key file downloaded along with a vehicle digital certificate by invoking a key loading function, and determining whether the soft key file is read successfully;
when the soft key file is not read successfully, creating a new soft key file, writing default key information to the new soft key file, and passing a key file handle to construct an EVP_PKEY structure for storing asymmetric key information;
when the soft key file is read successfully, passing the key file handle to construct the EVP_PKEY structure;
invoking a key query interface to try to obtain the numbers N and E in the key pair, and determining whether the numbers N and E in the key pair are obtained successfully;
when the numbers N and E in the key pair are obtained successfully, replacing numbers N and E in the EVP_PKEY structure with the numbers N and E in the key pair, and returning the EVP_PKEY structure; and
when the numbers N and E in the key pair are not obtained successfully, returning a null pointer.

9. The method according to claim 1, wherein loading the hard encryption engine comprises:
loading the hard encryption engine;
generating an original random number through a random function, and sending the original random number to the hard encryption engine;
controlling the hard encryption engine to load an encryption algorithm engine to encrypt the original random number to obtain an encrypted random number;
sending the encrypted random number to a decryption engine to decrypt to obtain a decrypted random number; and
comparing the decrypted random number with the original random number.

10. A computing device, comprising:
at least one processor; and
a storage device storing a plurality of instructions, which when executed by the processor, causes the at least one processor to:
generate a relationship between encryption identifiers and information parameters, wherein the information parameters comprise information security levels, information sizes, and information access speeds, the encryption identifiers comprise a soft encryption identifier indicating a soft encryption mode and a hard encryption identifier indicating a hard encryption mode;
obtain a target encryption identifier of current to-be-encrypted information, and determine a target encryption mode of the current to-be-encrypted information according to the encryption identifier; and
load an encryption engine corresponding to the current to-be-encrypted information according to the target encryption mode, comprising loading a soft encryption engine or loading a hard encryption engine, wherein loading the soft encryption engine comprises: initializing a chip engine;
generating a chip key; and loading the chip key.

11. The computing device according to claim 10, wherein the at least one processor further:
divides the information security levels into a high security level and a low security level;
divides the information sizes into a large size and a small size by comparing the information sizes with a storage space threshold; and
divides the information access speeds into a fast access speed and a slow access speed by comparing the information access speeds with an access speed threshold.

12. The computing device according to claim 11, wherein the at least one processor further:
specifies that the information parameters comprising the low security level, the small size, and the fast access speed correspond to the encryption identifiers of the soft encryption identifier, and the information parameters comprising any of the high security level, the small size, and the fast access speed correspond to the encryption identifiers of the hard encryption identifier.

13. The computing device according to claim 11, wherein the storage space threshold is 500 Kilobyte (500 KB), the information sizes are designated as the large size when the information sizes are greater than or equal to 500 KB, and the information sizes are designated as the small size when the information sizes are less than 500 KB, and wherein the access speed threshold is 100 ms, the information access speeds are designated as the slow access speed when the information access speed are greater than or equal to 100 ms, and the information access speeds are designated as the fast access speed when the information access speed are less than 100 ms.

14. The computing device according to claim 13, wherein the at least one processor further:
reads the target encryption identifier carried in the current to-be-encrypted information; or
queries a table recording the relationship.

15. The computing device according to claim 10, wherein the at least one processor further:
constructs the chip engine by invoking a Secure Sockets Layer (SSL) initialization function and an engine loading function;
binds the chip engine to an index by invoking a function for initializing engine names;
registers an encryption algorithm of the chip engine in an OpenSSL engine by invoking a registration function for encryption algorithms; and
sets the encryption algorithm of the chip engine to be an RSA algorithm by default by invoking an engine setup function.

16. The computing device according to claim 15, wherein the at least one processor further:
generates a key pair by invoking a key generation function;
determines whether the soft encryption engine comprises a key obtaining algorithm;
when the soft encryption engine comprises the key obtaining algorithm, generates a key by invoking a built-in key generator, and returns a key structure directly; and
when the soft encryption engine does not comprise the key obtaining algorithm, invokes a key obtaining algorithm in the chip engine, generates a pseudo private key through a soft algorithm, obtains numbers N and E in the key pair by invoking a key obtaining interface, determines whether the chip key is successfully generated, replaces numbers N and E in the pseudo private key with the numbers N and E in the key pair and returning the key structure when the chip key is successfully generated, and returns an error code when the chip key is not successfully generated.

17. The computing device according to claim 16, wherein the at least one processor further:

tries to read a soft key file downloaded along with a vehicle digital certificate by invoking a key loading function, and determining whether the soft key file is read successfully;

when the soft key file is not read successfully, creates a new soft key file, writing default key information to the new soft key file, and passes a key file handle to construct an EVP_PKEY structure for storing asymmetric key information;

when the soft key file is read successfully, passes the key file handle to construct the EVP_PKEY structure;

invokes a key query interface to try to obtain the numbers N and E in the key pair, and determines whether the numbers N and E in the key pair are obtained successfully;

when the numbers N and E in the key pair are obtained successfully, replaces numbers N and E in the EVP_PKEY structure with the numbers N and E in the key pair, and returns the EVP_PKEY structure; and when the numbers N and E in the key pair are not obtained successfully, returns a null pointer.

18. A non-transitory storage medium having stored thereon computer-readable instructions that, when the computer-readable instructions are executed by a processor to implement the following method:

step S1, generating a relationship between encryption identifiers and information parameters, wherein the information parameters comprise information security levels, information sizes, and information access speeds, the encryption identifiers comprise a soft encryption identifier indicating a soft encryption mode and a hard encryption identifier indicating a hard encryption mode;

step S2, obtaining a target encryption identifier of current to-be-encrypted information, and determining a target encryption mode of the current to-be-encrypted information according to the encryption identifier; and step S3, loading an encryption engine corresponding to the current to-be-encrypted information according to the target encryption mode, comprising loading a soft encryption engine or loading a hard encryption engine, wherein loading the soft encryption engine comprises: initializing a chip engine; generating a chip key; and loading the chip key.

\* \* \* \* \*